April 19, 1966  E. M. PAUWELS  3,246,723
BRAKE ADJUSTER
Filed June 22, 1964  2 Sheets-Sheet 2
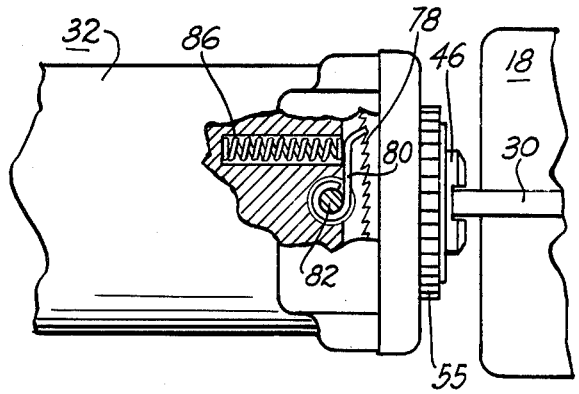
FIG_3
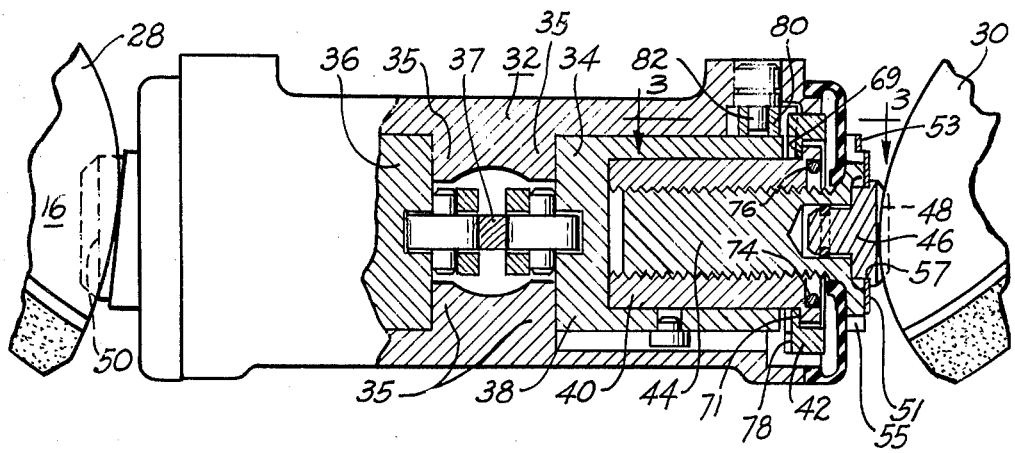
FIG_2
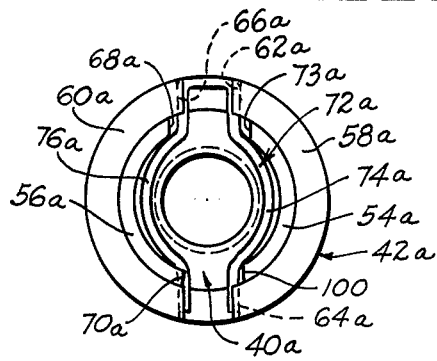
FIG_5
INVENTOR.
EDWARD M. PAUWELS.
BY
Sheldon F. Raizes
ATTORNEY.

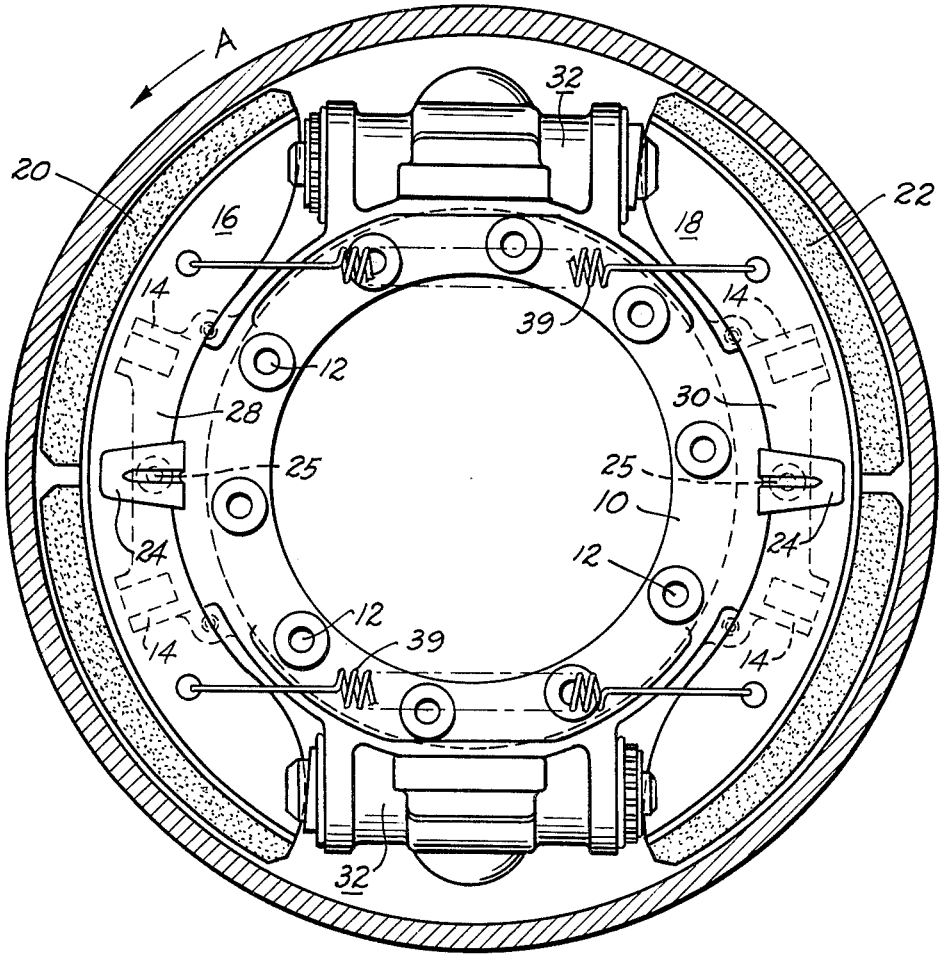
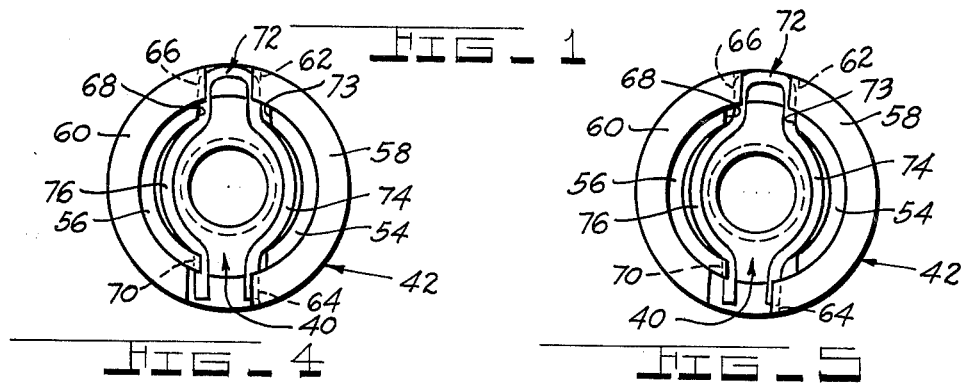

United States Patent Office 3,246,723
Patented Apr. 19, 1966

3,246,723
BRAKE ADJUSTER
Edward M. Pauwels, South Bend, Ind., assignor to The Bendix Corporation, South Bend, Ind., a corporation of Delaware
Filed June 22, 1964, Ser. No. 376,730
8 Claims. (Cl. 188—196)

This invention relates to an automatic adjuster for brakes and is an improvement of the adjuster disclosed in U.S. application Serial No. 381,268, filed July 8, 1964 (common assignee).

More particularly, the invention concerns an automatic adjuster for a brake comprising a rotatable adjuster nut having teeth thereon, a non-rotatable adjuster screw fixed to a brake shoe and threadedly connected to the adjuster nut, and pawl means engaging the teeth to rotate the adjuster nut relatively to the adjuster screw during return of the adjuster screw and the adjuster nut, as a unit, to release position for effecting longitudinal movement of the adjuster screw.

It has been found that under certain conditions during brake actuation the adjuster screw and the adjuster nut are forced as a unit toward their released position by forces acting on their respective brake shoes. This is called "kickback." Due to the loads exerted on the adjuster screw and the adjuster nut during brake actuation, the adjuster nut is not free to rotate relatively to the adjuster screw, in response to the rotational force exerted thereon by the pawl, during "kickback" condition and thus, either the pawl or the ratchet teeth are damaged during "kickback" condition.

Accordingly, it is an object of this invention to provide an automatic adjuster with means compensating for "kickback" condition to prevent damage to the adjusting mechanism during this condition.

Another object of this invention is to construct an adjuster of the type described above, which provides relative rotational movement between the adjuster nut and the teeth thereon to compensate for "kickback."

Still another object of the invention is to construct the "kickback" compensating means so the adjuster is operable at all times when the "kickback" condition has subsided.

Other objects of the invention will become apparent from the following description with reference to the drawings, wherein:

FIGURE 1 is a front elevational view of the brake assembly;

FIGURE 2 is a front section view of the actuator and adjusting mechanism of the brake assembly of FIGURE 1, which are illustrated in shoe retracted positions;

FIGURE 3 is a view taken along section line 3—3 of FIGURE 2;

FIGURE 4 is a view of the adjuster nut, ratchet assembly in a normal operating relationship relative to each other;

FIGURE 5 is a view similar to FIGURE 4 under "kickback" condition; and

FIGURE 6 is a side view of a modified adjuster nut and ratchet assembly.

Referring to FIGURE 1, the brake assembly illustrated therein has a torque spider 10 which is adapted to be mounted on a stationary part of a vehicle, such as an axle flange, by inserting bolts (not shown) through the circumferentially spaced holes 12. The torque spider has supporting ledges 14 for slidably supporting a pair of T-shaped brake shoes 16 and 18, having friction linings 20 and 22, respectively. A pair of hold-down springs 24 are each mounted to the torque spider by bolts 25 and each has a finger engaging the webs 28 and 30 of the brake shoes 16 and 18, respectively, for biasing the shoes against the supporting ledges 14. The torque spider also has a pair of diametrically opposed cylinder housings 32 formed integrally therewith, each of which contains a slidable plunger assembly 34 and a slidable plunger 36. A pair of anchor flanges 35 is located within each cylinder housing. The plunger assembly 34 and the plunger 36 each abut the anchor flanges 35 during released position and one of the plunger or plunger assemblies anchor on the anchor flanges 35 during braking depending upon drum rotation. The plunger assembly 34 and the plunger 36 are spread apart by a wedge member 37 which may be of any well known arrangement such as illustrated in U.S. Patent No. 2,527,126 issued to Goepfrich. A pair of shoe to shoe return springs 39 returns the shoes and thereby the plungers to released position.

The plunger assembly 34 comprises a hollow sleeve 38, an adjuster nut 40 carrying a toothed ratchet member 42 thereon, and an adjuster screw 44. The adjuster nut 40 has a hollow interior, the sidewalls of which are threaded for rotatably receiving the adjuster screw 44, which is T-shaped in cross section. A stud 46 is secured to the adjuster screw 44 for relative rotation therewith and has a slot 48 which slidingly receives one end of its respective brake shoe. The plunger 36 has a slot 50 at its outer end for slidably receiving one end of its respective brake shoe.

A spring clip 51 having a depending flange 53 disposed within one of a plurality of notches 55 on the outer periphery of the adjuster screw 44 has a central opening 57 with a plurality of flats which mate with flats on the stud 46 to prevent relative rotation between the stud 46 and the clip 51. Since the web 30 of the shoe 18 is disposed within the slot 48, rotation of the stud is prevented by the shoe and, therefore, rotation of the adjuster screw 44 is normally prevented since the clip 51 is unable to rotate. However, upon applying a tool to the notched periphery 55 of the screw 44, the screw 44 may be turned with the flange 53 slipping out of the notches during manual turning of the screw 44 to effect manual adjustment.

A pair of circumferentially spaced arcuate flanges 54 and 56 is located on the adjuster nut 40 and extends in an axial direction of the bore and a pair of circumferentially spaced arcuate flanges 58 and 60 is located on the ratchet member and encircles the flange 54 and 56, respectively. The end edges 62, 64 of the flange 58, the edge 66 of the flange 60, the edges 68 and 70 of the flange 56, form abutments for a generally U-shaped or hairpin shaped resilient member 72, which comprises a pair of legs 74 and 76. The abutment edges 62, 64, 70 and 66 define a groove to receive portions of the resilient member 74 therein. The closed end of the resilient member 72 is received within the abutment grooves 62 and 66 of the ratchet 42 and the free end of the leg 74 is received in the groove 64 of the ratchet 42 and the free end of the leg 76 is reecived within the groove 70 of the rotatable adjuster nut 40. The adjuster nut 40 has an annular shoulder 69 thereon which is engaged by an annular base portion 71 of the ratchet 42. Since the resilient member 72 is located within the respective grooves of the ratchet member 42 and the adjuster nut 40, the ratchet member is held in a fixed axial relationship relative to the adjuster nut 40. The resilient leg 74 acts on the abutment 64 to urge the ratchet 42 in a counterclockwise direction. The closed end of the resilient member 72 engages the abutment 68 on the adjuster nut 40 to limit the rotation of the ratchet 42 in a counterclockwise direction on the adjuster nut 40 and fix the normal operating position of the ratchet 42 on the adjuster nut 40. The closed end of the resilient member 72 is narrower than the distance between the abutment edges 68 and 73 of the flanges 56 and 54, respectively, to provide a clearance for sliding of the closed end of the resilient member 72 and thus relative rotation of the ratchet 42 and adjuster nut 40.

The ratchet member 42 has a plurality of teeth 78 on the undersurface thereof which is adapted to be engaged by a pawl 80 pivotally mounted on a pin 82 secured to the housing 32. The end of the pawl 84 is biased by a spring 86 into engagement with the teeth 78. The relationship between the pawl 80 and the teeth 78 is such that upon return of the plunger assembly to the brake release position, the pawl will effect a rotational force on the ratchet 42 tending to rotate the same in a clockwise direction. The spring force of the legs 74 and 76 is such that upon normal release of the brake, the force exerted on the ratchet by the pawl 80 will be less than the spring force of the legs 74 and 76 whereby the rotational force exerted on the ratchet will be transmitted through the resilient member 72 to the adjuster nut 40 to rotate the same in a clockwise direction. If the force of the pawl exerted on the ratchet 42 is greater than the spring force of the legs 74 and 76, then the ratchet 42 will rotate in a clockwise direction relative to the adjuster nut 40 against the force of the resilient member 72.

OPERATION

In operation, assuming rotation of the drum in the direction of arrow A, actuation of the wedge 37 will spread the plunger assembly 34 and the plunger 36 apart with the shoes 16 and 18 anchoring on flanges 35 through the plungers 36. The pawl 80 is pivoted on pin 82 by the spring 86 to follow the axial movement of the teeth 78 away from the housing. If the plunger assembly 34 has moved a predetermined distance in a brake actuating direction, then the pawl 80 will pick up a new tooth on the ratchet 42 and upon release of the actuating pressure on the wedge, the return springs 39 will return the plunger assembly 34 to its normally released position against the anchoring flange 35. During the return stroke of the plunger assembly 34 to its released position, the pawl 80 will be pivoted in a direction toward the housing thereby exerting a clockwise rotational force on the ratchet 42. The rotational force on the ratchet 42 will be transmitted through the resilient member 74 to the adjuster nut 40 to turn the same thus extending the adjuster screw 44 in an axial direction a given amount effecting automatic adjustment of the brake.

However, there is a condition which is known as "kickback" wherein the brake shoe, which is actuated by the plunger assembly 34, is thrust in a direction toward the brake released position during brake application. When "kickback" condition occurs, the plunger assembly 36 is being forced toward its normally released position and thus is forcing the pawl 80 to pivot in a direction toward the housing, with the pawl thus imparting a clockwise rotational force on the ratchet 42. However, there is too much friction between the threads on the adjuster screw 44 and the threads on the adjuster nut 40 to permit relative rotation therebetween. Since the adjuster nut 40 cannot rotate, the rotational force exerted on the ratchet 42 will be exerted on the leg 74 of the resilient member 72 resulting in the free end of the leg 76 reacting on the abutment groove 70 and the closed end of the resilient member 72 moving with the ratchet 42 in a clockwise direction. If the "kickback" condition subsides during brake application, the pawl 80 will pivot in a direction away from the housing 32 to follow movement of the plunger assembly 34 thereby allowing the resilient leg 74 to rotate the ratchet 72 in a counterclockwise direction relative to the adjuster nut 40 until the closed end of the resilient member 72 abuts the shoulder 68 on the flange 56, whereby the ratchet is returned to its normal operating position relative to the adjuster nut. Assuming that the braking pressure is released and thereby terminates the "kickback" condition while the plunger assembly 36 is between its released position and its fully applied position, the return springs 39 will retract the shoes and thereby urge the plunger assembly 34 the remaining distance of its return stroke to normally released position. Since the braking pressure is released, the adjuster nut 40 is free to rotate thus allowing the pawl 80 to be pivoted by the ratchet 42 to effect simultaneous rotation of the adjuster nut in accordance with the remaining distance of the return stroke. The ratchet member 42 will be held from counterclockwise rotation by the pawl 80. As a further phase of the adjustment, the resilient spring leg 76 will act on the abutment groove 70 of the adjuster nut and the leg 74 will react on the abutment groove 64 of the ratchet and on the pawl 80 through the ratchet 42 to rotate the adjuster nut 40 in a clockwise direction to additionally extend the adjuster screw 44 in accordance to the return stroke distance the plunger assembly was thrust during "kickback" condition.

Referring to FIGURE 6, a modification of the adjuster nut and the ratchet member connection is illustrated. All elements which are the same as in the previous embodiment are designated with the same reference number with an "a" affixed thereto. In this embodiment the free ends of the legs 76a and 74a abut against abutment groove 70a and abutment 100 on flanges 56a and 54a respectively. There is clearance between the closed end of the resilient member 72a and the abutment 68a and 73a to allow relative rotational movement of the ratchet 42a and the adjuster nut 40a. The engagement of the free end of the leg 76a on the abutment groove 70a limits the rotation of the ratchet on the adjuster nut 40a and defines the normal operating position of the ratchet on the adjuster nut. The operation of the ratchet and adjuster nut is the same as in the previous embodiment wherein counterclockwise rotation exerted on the ratchet 42a by the pawl 80a will result in the leg 76a reacting on the abutment groove 70a and the leg 74a being moved against the spring force of the resilient member 72a by the ratchet member 42a. If the brake is still being applied when the "kickback" condition has subsided, the leg 74a will return the ratchet and sleeve to their relative normal operating positions and if the brake is released during "kickback" condition, the leg 76a will exert a rotational force on the flange 56a and thereby the adjuster nut 42a to rotate the same in a clockwise direction to effect adjustment of the brake.

It can be seen that the resilient members 72 and 72a each serve two purposes: (1) effecting a driving connection between the ratchet and adjuster nut which permits overtravel and absorption of rotational force exerted by the pawl on the ratchet during "kickback" condition, and (2) it also effects rotation of the adjuster nut to conform with the automatic adjustment dictated by the pawl when the "kickback" condition terminates upon brake release.

Numerous adaptations of the invention, in addition to those illustrated, will be obvious to those skilled in the art. It is my intention to include within the scope of the following claims all equivalent applications of the invention whereby the same or substantially the same results may be obtained.

I claim:

1. In a brake: a housing member, a bore in said housing member, a plunger assembly mounted in said bore for slidable movement relative to said housing member in a brake applying direction and in a return direction, said plunger assembly comprising a non-rotatable threaded member and a rotatable member threadedly connected to said non-rotatable member, a ratchet rotatably mounted on said rotatable member, means including resilient means drivingly connecting said ratchet to said rotatable member, said resilient means urging said ratchet member into a normal driving position relative to said rotatable member, pawl means operatively connected to said housing and urged into engagement with said ratchet member, said pawl means being arranged relative to said ratchet member to impart a rotational force thereon upon return movement of said plunger assembly, whereby said rotational force imparted on said ratchet member is transmitted through said resilient means to effect rotation of said rotatable member upon normal return movement of said plunger assembly and said pawl means will effect rotational movement of said ratchet member relative to said rotatable member against the force of said resilient means upon return movement of said plunger assembly caused by "kickback."

2. In a brake: a housing member, a bore in said housing, a plunger assembly mounted in said bore for slidable movement relative to said housing member in a brake applying direction and in a return direction, said plunger assembly comprising a non-rotatable threaded member and a rotatable member threadedly connected to said non-rotatable member, a ratchet rotatably mounted on said rotatable member for rotation and relative rotation therewith, said rotatable member having abutment means thereon, means operatively connected to said ratchet and said rotatable member resiliently urging said ratchet in a rotational direction into operative engagement with said abutment means to define the normal position of said ratchet on said rotatable member, pawl means operatively connected to said housing and urged into engagement with said ratchet member, said pawl means being arranged relative to said ratchet member to impart a rotational force thereon opposite to that imparted thereon by said resilient means upon return movement of said plunger assembly, whereby said rotational force imparted on said ratchet member by said pawl means is transmitted through said resilient means to effect rotation of said rotatable member upon normal return movement of said plunger assembly and said pawl means will effect rotational movement of said ratchet relative to said rotatable member against the force of said resilient means upon return movement of said plunger assembly caused by "kickback."

3. In a brake: a housing, a bore in said housing, a plunger assembly mounted in said bore for slidable movement relative to said housing member in a brake applying direction and in a return direction, said plunger assembly comprising a non-rotatable threaded member and a rotatable member threadedly connected to said non-rotatable member, a ratchet mounted on said rotatable member for rotation and relative rotation therewith, a pair of circumferentially spaced abutments on said ratchet, a generally U-shaped resilient member comprising a pair of legs joined together at one end and free at the other end, the joined end of said legs being disposed between said pair of abutments and engaging the same, said rotatable member having a first abutment adjacent to and being engaged by the free end of one of said legs, said ratchet member having an additional abutment adjacent to and being engaged by the free end of the other of said legs, said rotatable member having additional abutment means located for engagement by said resilient member for limiting rotation of said ratchet by said other leg for positioning the ratchet in a normal position relative to said rotatable member, pawl means operatively connected to said housing and urged into engagement with said ratchet member, said pawl means being arranged relative to said ratchet member to impart a rotational force thereon in a direction opposite to the rotational force imparted by said other leg thereon upon return movement of said plunger assembly, whereby said rotational force imparted on said ratchet member by said pawl means is transmitted through said resilient member to effect rotation of said rotatable member upon normal return movement of said plunger assembly and said pawl means will effect rotational movement of said ratchet member relative to said rotatable member against the force of said resilient member upon return movement of said plunger assembly caused by "kickback."

4. The structure as recited in claim 3 wherein said resilient member is located in a plane which is generally perpendicular to the axis of said bore and said legs straddle said non-rotatable member.

5. In a brake: a housing, a bore in said housing, a plunger assembly mounted in said bore for slidable movement relative to said housing member in a brake applying direction and in a return direction, said plunger assembly comprising a non-rotatable threaded member and a rotatable member threadedly secured to said non-rotatable member, a ratchet mounted on said rotatable member for rotation and relative rotation therewith, a pair of circumferentially spaced abutments on said ratchet, said rotatable member having a first abutment adjacent one of said pair of abutments, a generally U-shaped resilient member comprising a pair of legs joined together at one end and free at the other end, the joined end of said legs being disposed between said pair of abutments and engaging the same, one of said legs engaging said first abutment on said rotatable member, said rotatable member having a second abutment adjacent to and being engaged by the free end of said one leg, said ratchet having an additional abutment adjacent to and engaged by the free end of the other of said legs, said other leg urging said ratchet in one rotational direction relative to said rotatable member, said first abutment member serving as a stop for said ratchet member defining the normal position of said ratchet member on said rotatable member, pawl means operatively connected to said housing and urged into engagement with said ratchet member, said pawl means being arranged relative to said ratchet member to impart a rotational force in a direction opposite to the force exerted thereon by said resilient member upon return movement of said plunger assembly, whereby said rotational force imparted on said ratchet member by said pawl means is transmitted through said resilient member to effect rotation of said rotatable member upon normal return movement of said plunger assembly and said pawl means will effect rotational movement of said ratchet member relative to said rotatable member against the force of said resilient member upon return movement of said plunger assembly caused by "kickback."

6. The structure as recited in claim 5 wherein said resilient member is located in a plane which is generally perpendicular to the axis of said bore and said legs straddle said non-rotatable member.

7. In a brake: a housing, a bore in said housing, a plunger assembly mounted in said bore for slidable movement relative to said housing member in a brake applying direction and in a return direction, said plunger assembly comprising a non-rotatable threaded member and a rotatable member threadedly connected to said non-rotatable member, said rotatable member having an annular flange thereon, a ratchet concentric with said annular flange and disposed on the outer periphery thereof for rotation and relative rotation therewith, a first pair of circumferentially spaced radially extending arcuate flanges on said ratchet, a second pair of circumferentially spaced radially extending arcuate flanges on said rotatable member annular flange adjacent to and radially inwardly of said first pair of flanges, one pair of adjacent ends of said first pair of flanges defining a first pair of abutments, one pair of adjacent ends of said second pair of flanges defining a second pair of abutments adjacent said first pair of abutments, the other pair of adjacent ends of said second pair of flanges defining a third pair of abutments on said rotatable member annular flange diametrically opposite said second pair of abutments, one of said ends of the other pair of adjacent ends of said first pair of flanges defining an additional abutment adjacent to one of said third pair of abutments, a generally U-shaped resilient member located in a plane generally perpendicular to the axis of said bore and comprising a pair of legs joined together at one end and free at the other end, said pair of legs straddling said non-rotatable member, the joined end of said legs being disposed between said first and second pair of abutments and engaging said first pair of abutments, said free end of said legs extending between said third pair of abutments, one of said legs being biased into engagement with one of said third pair of abutments and the other of said legs being biased into engagement with said additional abutment, said other leg exerting a rotational force on said ratchet and thereby urging the joined end of said one leg into engagement with its respective abutment of said second pair of abutments, a clearance between the other of said second pair of abutments and said other leg, pawl means operatively connected to said housing and urged into engagement with said ratchet, said pawl means being arranged relative to said ratchet to impart a rotational force thereon in a direction opposite to the rotational force exerted by said other leg of said resilient member upon return movement of said plunger assembly, whereby said rotational force imparted on said ratchet member is transmitted through said resilient member to effect rotation of said rotatable member upon normal return movement of said plunger assembly and said pawl means will effect rotational movement of said ratchet relative to said rotatable member against the force of said resilient means upon return movement of said plunger assembly caused by "kickback."

8. In a brake: a housing, a bore in said housing, a plunger assembly mounted in said bore for slidable movement relative to said slidable member in a brake applying direction and in a return direction, said plunger assembly comprising a non-rotatable threaded member and a rotatable member threadedly connected to said non-rotatable member, said rotatable member having an annular flange thereon, a ratchet concentric with said annular flange and disposed on the outer periphery thereof for rotation and relative rotation therewith, a first pair of circumferentially spaced radially extending arcuate flanges on said ratchet, a second pair of circumferentially spaced radially extending arcuate flanges on said rotatable member annular flange adjacent to and radially inwardly of said first pair of flanges, one pair of adjacent ends of said first pair of flanges defining a first pair of abutments, one pair of adjacent ends of said second pair of flanges defining a second pair of abutments adjacent said first pair of abutments, the other pair of adjacent ends of said second pair of flanges defining a third pair of abutments on said rotatable member annular flange diametrically opposite said second pair of abutments, one of said ends of the other pair of adjacent ends of said first pair of flanges defining an additional abutment adjacent to one of said third pair of abutments, a generally U-shaped resilient member located in a plane generally perpendicular to the axis of said bore and comprising a pair of legs joined together at one end and free at the other end, said pair of legs straddling said non-rotatable member, the joined end of said legs being disposed between said first and second pair of abutments and engaging said first pair of abutments, said free end of said legs extending between said third pair of abutments, one of said legs being biased into engagement with one of said third pair of abutments and the other of said legs being biased into engagement with the other of said third pair of abutments and said additional abutment, said other leg exerting a rotational force on said ratchet, a clearance between said second pair of abutments and the joined end of each of said legs, pawl means operatively connected to said housing and urged into engagement with said ratchet, said pawl means being arranged relative to said ratchet to impart a rotational force thereon in a direction opposite to the rotational force exerted by said other leg of said resilient member upon return movement of said plunger assembly, whereby said rotational force imparted on said ratchet member is transmitted through said resilient member to effect rotation of said rotatable member upon normal return movement of said plunger assembly and said pawl means will effect rotational movement of said ratchet relative to said rotatable member against the force of said resilient means upon return movement of said plunger assembly caused by "kickback."

No references cited.

MILTON BUCHLER, *Primary Examiner.*